United States Patent
Bhardwaj et al.

(10) Patent No.: US 8,679,201 B2
(45) Date of Patent: *Mar. 25, 2014

(54) INCREASING THE STIFFNESS OF BATTERY CELLS FOR PORTABLE ELECTRONIC DEVICES

(75) Inventors: Ramesh C. Bhardwaj, Fremont, CA (US); Sheba Devan, Santa Clara, CA (US); Taisup Hwang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/273,113

(22) Filed: Oct. 13, 2011

(65) Prior Publication Data

US 2013/0095357 A1 Apr. 18, 2013

(51) Int. Cl.
*H01M 2/02* (2006.01)
*H01M 10/04* (2006.01)
*H01M 10/0587* (2010.01)

(52) U.S. Cl.
USPC ........................................................ 29/623.4

(58) Field of Classification Search
USPC ................................... 29/623.1, 623.2, 623.4
See application file for complete search history.

(56) References Cited

U.S. PATENT DOCUMENTS

| 5,916,515 | A  | * | 6/1999  | Bryan et al. ............... 29/623.3 |
| 6,024,773 | A  | * | 2/2000  | Inuzuka et al. ............ 29/623.4 |
| 6,582,480 | B2 | * | 6/2003  | Pasquier et al. ........... 29/623.2 |
| 7,163,762 | B2 | * | 1/2007  | Endo et al. ..................... 429/94 |
| 2003/0005577 | A1 |   | 1/2003  | Kitano |
| 2003/0167627 | A1 |   | 9/2003  | Fujino |
| 2003/0194607 | A1 |   | 10/2003 | Huang |
| 2008/0138706 | A1 | * | 6/2008  | Takayama et al. ........... 429/210 |
| 2009/0305121 | A1 | * | 12/2009 | Yoon et al. ..................... 429/94 |
| 2011/0052953 | A1 | * | 3/2011  | Saito et al. ..................... 429/94 |

FOREIGN PATENT DOCUMENTS

| EP | 1176660 A2 | 1/2002 |
| JP | 2003086251 A | * 3/2003 |
| JP | 2006120577 A | 5/2006 |
| WO | 9852244 A1 | 11/1998 |

OTHER PUBLICATIONS

IPDL Machine Translation of the Detailed Description of JP 2003-086251A (Mar. 2003).*

* cited by examiner

*Primary Examiner* — Gregg Cantelmo
(74) *Attorney, Agent, or Firm* — Park, Vaughan, Fleming & Dowler LLP; Chia-Hsin Suen (57) ABSTRACT

The disclosed embodiments relate to the manufacture of a battery cell. The battery cell includes a set of layers including a cathode with an active coating, a separator, and an anode with an active coating. The battery cell also includes a pouch enclosing the layers, wherein the pouch is flexible. The layers may be wound to create a jelly roll prior to sealing the layers in the flexible pouch. The stiffness of the battery cell may be increased by applying a pressure of at least 0.13 kilogram-force (kgf) per square millimeter and a temperature of about 85° C. to the layers.

9 Claims, 7 Drawing Sheets

INCREASING THE STIFFNESS OF BATTERY CELLS FOR PORTABLE ELECTRONIC DEVICES

BACKGROUND

1. Field

The present embodiments relate to batteries for portable electronic devices. More specifically, the present embodiments relate to techniques for increasing the stiffness of battery cells for portable electronic devices.

2. Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

Conversely, the lack of a rigid, sealed battery enclosure may increase the susceptibility of lithium-polymer batteries to faults caused by mechanical stress. Such faults may occur during assembly of the batteries, installation of the batteries in portable electronic devices, and/or use of the portable electronic devices. For example, the dropping of an object onto a lightweight portable electronic device may dent the portable electronic device's enclosure, as well as a lithium-polymer battery underneath the enclosure. The dent may deform, weaken, and/or compress the battery's electrodes and/or separator, thus compromising the integrity of the battery and potentially causing a short circuit and/or another fault in the battery.

Hence, the use of portable electronic devices may be facilitated by mechanisms that improve the resistance of lithium-polymer battery cells to mechanical stress.

SUMMARY

The disclosed embodiments relate to the manufacture of a battery cell. The battery cell includes a set of layers including a cathode with an active coating, a separator, and an anode with an active coating. The battery cell also includes a pouch enclosing the layers, wherein the pouch is flexible. The layers may be wound to create a jelly roll prior to sealing the layers in the flexible pouch. The stiffness of the battery cell may be increased by applying a pressure of at least 0.13 kilogram-force (kgf) per square millimeter and a temperature of about 85° C. to the layers.

In some embodiments, the pressure and the temperature are applied to the layers for about eight hours. The combination of pressure, temperature, and time may increase the stiffness of the battery cell and improve the resistance of the battery cell to mechanical stress.

In some embodiments, the set of layers further includes a binder coating that laminates the layers together upon applying the pressure and the temperature to the layers. The binder coating may be approximately 1 micron thick and include polyvinylidene fluoride (PVDF) and/or another binder material. The binder coating may be applied as a continuous coating and/or non-continuous coating to the separator, cathode, and/or anode. For example, the binder coating may be applied as a continuous coating on the separator using a dip-coating technique. On the other hand, the binder coating may be applied as a non-continuous coating on the cathode and/or anode using a spray-coating technique.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a fieldprogrammable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
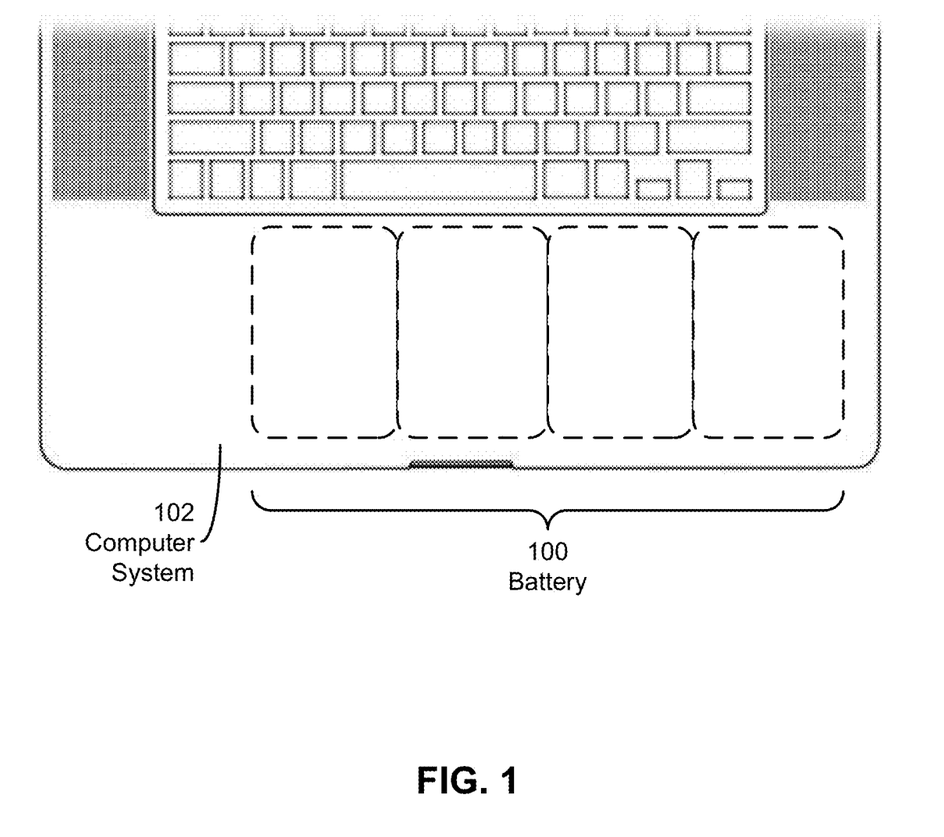
FIG. 1 shows the placement of a battery in a computer system in accordance with an embodiment.

FIG. 1 shows the placement of a battery 100 in a computer system 102 in accordance with an embodiment. Computer system 102 may correspond to a laptop computer, personal digital assistant (PDA), portable media player, mobile phone, digital camera, tablet computer, and/or other portable electronic device. Battery 100 may correspond to a lithium-polymer battery and/or other type of power source for computer system 102. For example, battery 100 may correspond to a lithium-polymer battery that includes one or more cells packaged in flexible pouches. The cells may then be connected in series and/or in parallel and used to power computer system 102.

In one or more embodiments, battery 100 is designed to accommodate the space constraints of computer system 102. For example, battery 100 may include cells of different sizes and thicknesses that are placed side-by-side, top-to-bottom, and/or stacked within computer system 102 to fill up the free space within computer system 102. The use of space within computer system 102 may additionally be optimized by omitting a separate enclosure for battery 100. For example, battery 100 may include non-removable pouches of lithium-polymer cells encased directly within the enclosure for computer system 102. As a result, the cells of battery 100 may be larger than the cells of a comparable removable battery, which in turn may provide increased battery capacity and weight savings over the removable battery.

On the other hand, the elimination of a separate, sealed enclosure for battery 100 may increase the susceptibility of battery 100 to contamination and/or damage. First, battery 100 may be physically vulnerable until battery 100 is encased within the enclosure for computer system 102. In addition, the enclosure for computer system 102 may provide limited protection against mechanical stress on battery 100. For example, the dropping of computer system 102 onto a hard surface and/or a hard object onto computer system 102 may dent both the enclosure for computer system 102 and one or more cells of battery 100. In turn, the dent may deform, compress, and/or weaken the electrodes within the cell(s), potentially resulting in shortened cycle life, reduced capacity, an electrical short, and/or other fault or failure in battery 100. Battery 100 may thus be susceptible to physical damage during assembly, installation in computer system 102, and/or use of computer system 102.

In one or more embodiments, the resistance of battery 100 to mechanical stress is improved by increasing the stiffness of battery 100 during manufacturing of battery 100. As discussed in further detail below, the increased stiffness may be provided by obtaining a set of layers for a battery cell, including a cathode with an active coating, a separator, an anode with an active coating, and a binder coating applied to the cathode, anode, and/or separator. The layers may be sealed in a pouch to form the battery cell. To increase the stiffness of battery 100, a pressure of at least 0.13 kilogram-force (kgf) per square millimeter and a temperature of about 85° C. may be applied to the layers. Such application of pressure and/or temperature may compress the layers and/or melt the binder coating, thus laminating the layers together. The stiffness of the battery cell may additionally be increased by applying the pressure and/or temperature for about eight hours.

Figure 2:
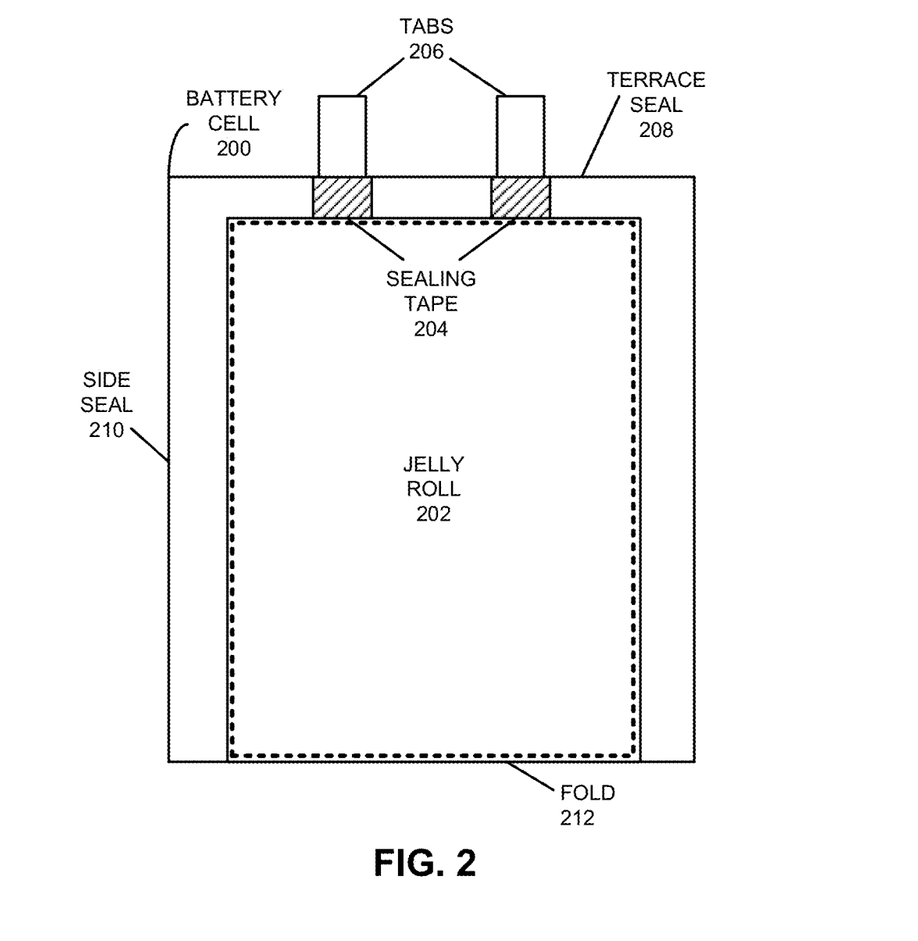
FIG. 2 shows a battery cell in accordance with an embodiment.

FIG. 2 shows a battery cell 200 in accordance with an embodiment. Battery cell 200 may correspond to a lithium-polymer cell that is used to power a portable electronic device. Battery cell 200 includes a jelly roll 202 containing a number of layers which are wound together, including a cathode with an active coating, a separator, and an anode with an active coating. More specifically, jelly roll 202 may include one strip of cathode material (e.g., aluminum foil coated with a lithium compound) and one strip of anode material (e.g., copper foil coated with carbon) separated by one strip of separator material (e.g., conducting polymer electrolyte). As discussed below with respect to FIG. 3, jelly roll 202 may also include a binder coating that is used to laminate and/or bond the layers together and increase the stiffness of battery cell 200. The cathode, anode, and separator layers may then be wound on a mandrel to form a spirally wound structure. Jelly rolls are well known in the art and will not be described further.

During assembly of battery cell 200, jelly roll 202 is enclosed in a flexible pouch, which is formed by folding a flexible sheet along a fold line 212. For example, the flexible sheet may be made of aluminum with a polymer film, such as polypropylene and/or polyethylene. After the flexible sheet is folded, the flexible sheet can be sealed, for example by applying heat along a side seal 210 and along a terrace seal 208.

Jelly roll 202 also includes a set of conductive tabs 206 coupled to the cathode and the anode. Conductive tabs 206 may extend through seals in the pouch (for example, formed using sealing tape 204) to provide terminals for battery cell 200. Conductive tabs 206 may then be used to electrically couple battery cell 200 with one or more other battery cells to form a battery pack. For example, the battery pack may be formed by coupling the battery cells in a series, parallel, or series-and-parallel configuration.

Figure 3:
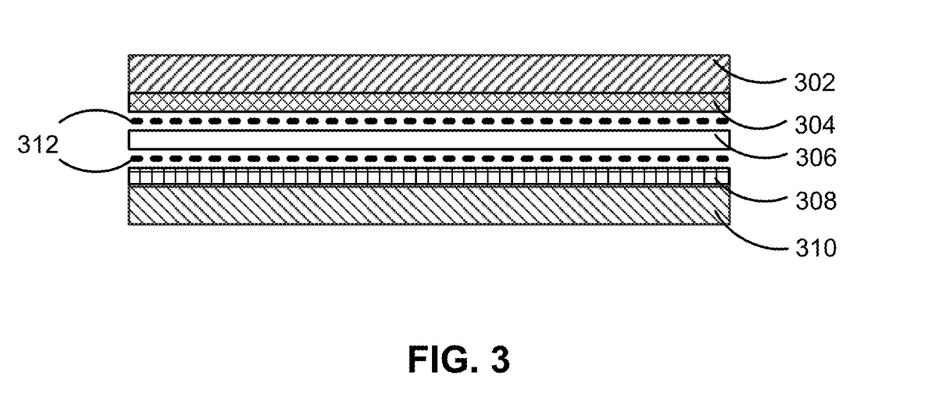
FIG. 3 shows a set of layers for a battery cell in accordance with an embodiment.

FIG. 3 shows a set of layers for a battery cell (e.g., battery cell 200 of FIG. 2) in accordance with an embodiment. The layers may include a cathode current collector 302, cathode active coating 304, separator 306, anode active coating 308, and anode current collector 310. The layers may be wound to create a jelly roll for the battery cell, such as jelly roll 202 of FIG. 2. Alternatively, the layers may be used to form other types of battery cell structures, such as bi-cell structures.

As mentioned above, cathode current collector 302 may be aluminum foil, cathode active coating 304 may be a lithium compound, anode current collector 310 may be copper foil, anode active coating 308 may be carbon, and separator 306 may include polypropylene and/or polyethylene. The layers may also include a binder coating 312 between separator 306 and cathode active coating 304 and/or anode active coating 308. Binder coating 312 may include polyvinylidene fluoride (PVDF) and/or another binder material. Binder coating 312 may be approximately 1 micron thick to facilitate optimal laminating of the layers without degrading the cycle life of the battery cell.

In addition, binder coating 312 may correspond to a continuous coating and/or non-continuous coating on separator 306, cathode active coating 304, and/or anode active coating 308. For example, binder coating 312 may be applied as a continuous coating on separator 306 using a dip-coating technique. On the other hand, binder coating 312 may be applied as a non-continuous coating on cathode active coating 304 and/or anode active coating 308 using a spray-coating technique.

During manufacturing of the battery cell, layers may be sealed into a flexible pouch to form the battery cell. Next, a pressure of at least 0.13 kgf per square millimeter and a temperature of about 85° C. may be applied to the layers. The pressure and/or temperature may additionally be applied for a pre-specified period of time. For example, to create a battery cell for a tablet computer, a set of steel plates and a heater may be used to apply a pressure of 900 kgf and a temperature of 85° C. for about eight hours to the layers. The application of pressure and/or temperature to the layers may further melt binder coating 312 and laminate (e.g., bond) the layers together, creating a solid, compressed structure instead of a set of unbonded layers wound together. Such use of pressure, temperature, time, and/or binder coating 312 in manufacturing the battery cell may increase the stiffness of the battery cell, and in turn, increase the battery cell's resistance to mechanical stress, as discussed in further detail below with respect to FIG. 5.

Prior to applying the pressure and the temperature to the layers, a formation charge may be performed on the battery cell. The formation charge may electrochemically form the battery cell by leaving a voltage and polarity imprint on the layers. However, the formation charge may generate gas that accumulates within the pouch. As a result, the battery cell may be degassed after the pressure and temperature are applied to the layers to release the gas and prepare the battery cell for installation in a portable electronic device, as discussed in further detail below with respect to FIG. 4.

Figure 4:
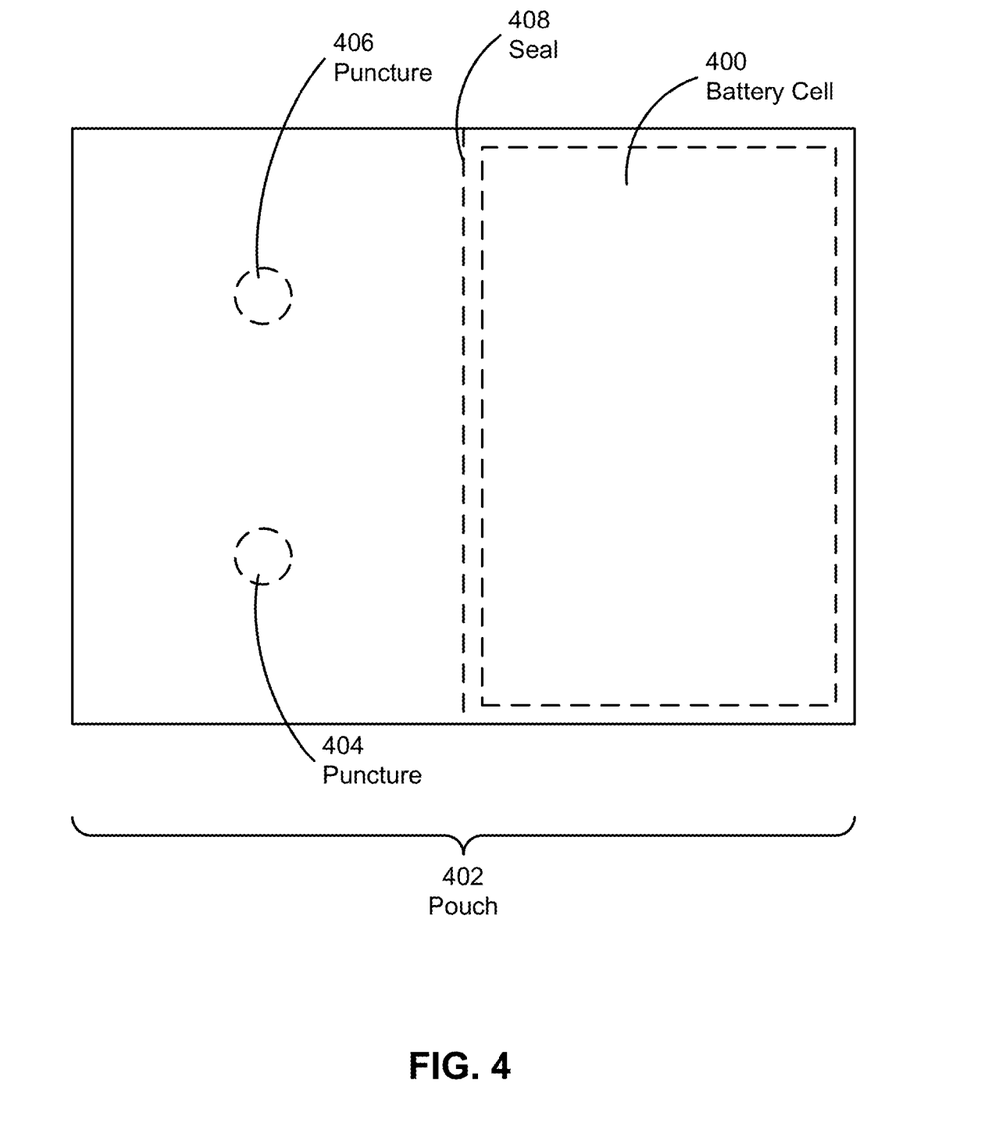
FIG. 4 shows the degassing of a battery cell in accordance with an embodiment.

FIG. 4 shows the degassing of a battery cell 400 in accordance with an embodiment. As shown in FIG. 4, battery cell 400 is enclosed in a pouch 402. In addition, pouch 402 contains extra material that does not contact the layers (e.g., cathode, anode, separator, binder coating) of battery cell 400.

To degas battery cell 400, a number of punctures 404-406 are made in the portion of the pouch not contacting the layers of battery cell 400 to release gas generated by battery cell 400 during a formation charge. Next, a new seal 408 is formed in pouch 402 along a line that is closer to the layers of battery cell 400 than punctures 406. In other words, seal 408 may be formed to hermetically reseal battery cell 400 in pouch 402 after punctures 404-406 have been made. Finally, extra pouch material associated with the punctured portion of pouch 402 (e.g., to the left of seal 408) is removed to complete the manufacturing of battery cell 400. Battery cell 400 may then be installed into a portable electronic device for use as a power source for the portable electronic device.

Figure 5:
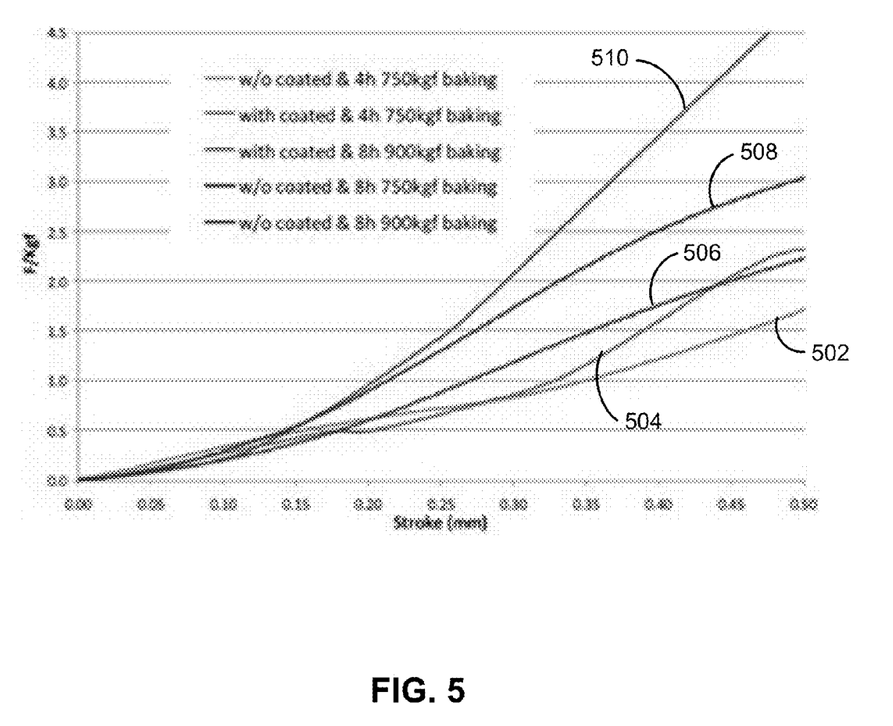
FIG. 5 shows an exemplary plot in accordance with an embodiment.

FIG. 5 shows an exemplary plot in accordance with an embodiment. In particular, FIG. 5 shows a plot of battery cell deformation (in millimeters) as a function of force (in kgf) applied to the centers of different battery cells. Deformation 502 may be observed from a battery cell created without a binder coating and with a pressure of 750 kgf applied to the battery cell for four hours. Deformation 504 may be observed from a battery cell created using a 1-micron-thick binder coating (e.g., binder coating 312 of FIG. 3) and a pressure of 750 kgf applied to the battery cell for four hours. Deformation 506 may be observed from a battery cell created without a binder coating and a pressure of 750 kgf applied to the battery cell for eight hours. As shown in FIG. 5, battery cells associated with deformations 504-506 may provide, at best, slight improvements in stiffness over the battery cell associated with deformation 502.

On the other hand, deformations 508-510 may be observed from battery cells created by applying a pressure of 900 kgf to each battery cell for eight hours. The battery cell associated with deformation 508 does not include a binder coating, while the battery cell associated with deformation 510 includes a 1-micron-thick binder coating. Deformations 508-510 represent significant improvements in battery cell stiffness compared to deformations 502-506, with deformation 510 representing the highest battery cell stiffness of all battery cells associated with deformations 502-510. Consequently, battery cell stiffness may be improved the most by adding a binder coating to the layers of the battery cell and applying a pressure of 900 kgf (e.g., 0.13 kgf per square millimeter) for about eight hours to the battery cell.

Figure 6:
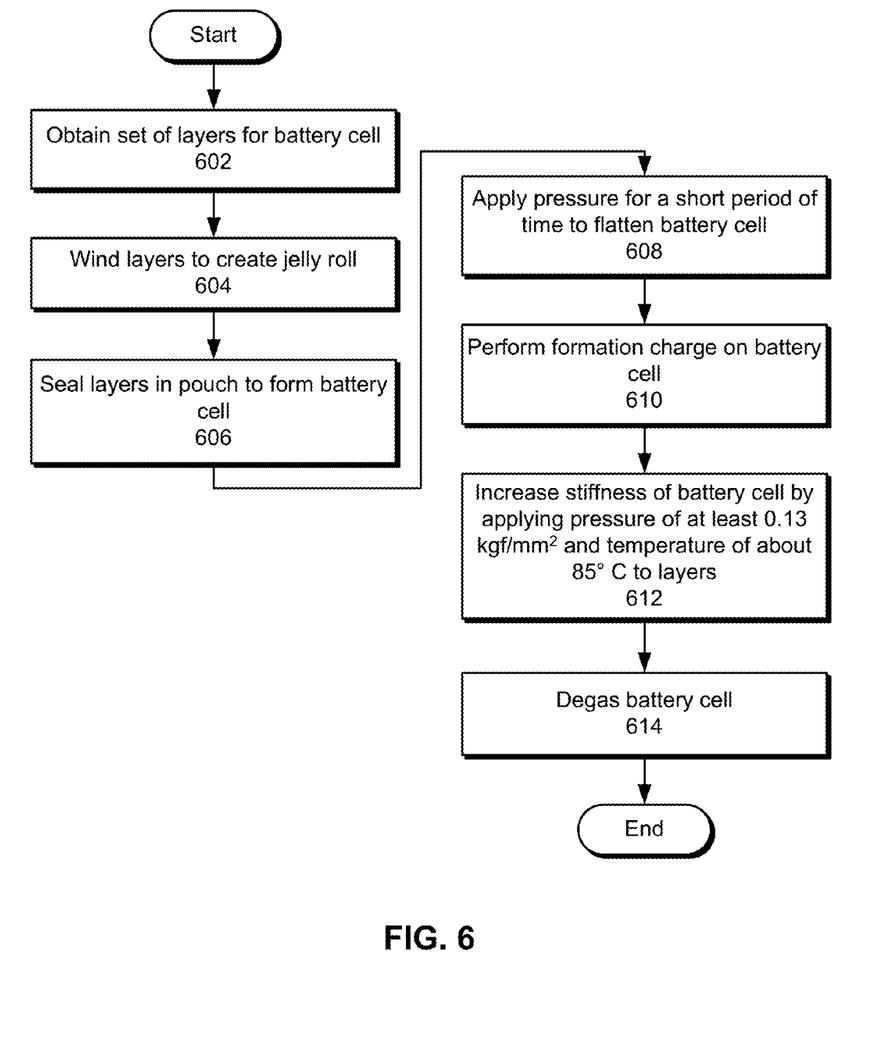
FIG. 6 shows a flowchart illustrating the process of manufacturing a battery cell in accordance with an embodiment.

FIG. 6 shows a flowchart illustrating the process of manufacturing a battery cell in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, a set of layers for the battery cell is obtained (operation 602). The layers may include a cathode with an active coating, a separator, and an anode with an active coating. The layers may also include a binder coating applied to the cathode, anode, and/or separator as a continuous and/or non-continuous coating. In addition, the binder coating may be approximately 1 micron thick to enable the laminating of the cathode, anode, and separator layers without degrading the cycle life of the battery cell.

Next, the layers are wound to create a jelly roll (operation 604). The winding step may be skipped and/or altered if the layers are used to create other battery cell structures, such as bi-cells. The layers are then sealed in a pouch to form the battery cell (operation 606). For example, the battery cell may be formed by placing the layers into the pouch, filling the pouch with electrolyte, and forming side and terrace seals along the edges of the pouch. The battery cell may then be left alone for 1-1.5 days to allow the electrolyte to distribute within the battery cell.

After the layers are sealed in the pouch, pressure is applied for a short period of time to flatten the battery cell (operation 608), and a formation charge is performed on the battery cell (operation 610). For example, the pressure may be applied for about a minute using a set of steel plates on either side of the battery cell. The formation charge may then be performed at one or more charge rates until the battery's voltage reaches a pre-specified amount.

The stiffness of the battery cell is then increased by applying a pressure of at least 0.13 kgf per square millimeter and a temperature of about 85° C. to the layers (operation 612). In addition, the pressure and temperature may be applied to the layers for about eight hours. Such application of pressure, temperature, and/or time may melt the binder coating and laminate the cathode, anode, and separator layers together, thus forming a solid structure that resists mechanical stress better than a set of unbonded layers of a jelly roll and/or other battery cell structure.

Finally, the battery cell is degassed (operation 614). To degas the battery cell, a portion of the pouch that does not contact the layers is punctured to release gas generated during the formation charge by the battery cell. Next, the pouch is resealed along a line that is closer to the layers than the punctured portion. Finally, extra pouch material associated with the punctured portion is removed from the battery cell.

Figure 7:
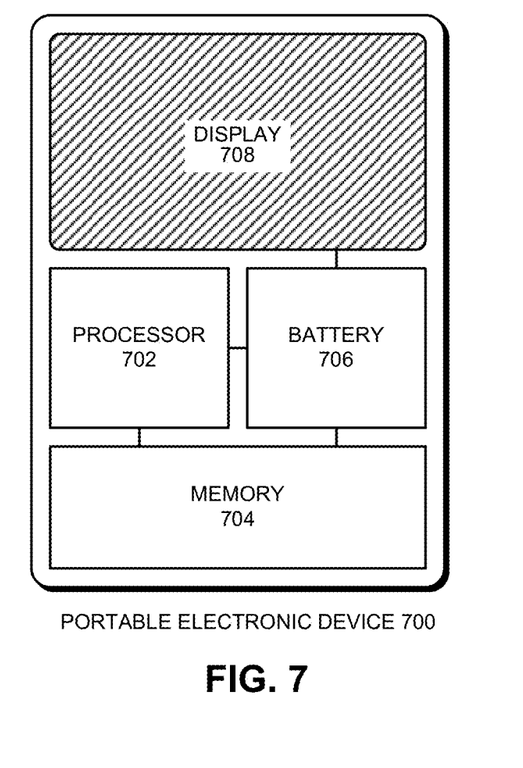
FIG. 7 shows a portable electronic device in accordance with an embodiment.

The above-described rechargeable battery cell can generally be used in any type of electronic device. For example, FIG. 7 illustrates a portable electronic device 700 which includes a processor 702, a memory 704 and a display 708, which are all powered by a battery 706. Portable electronic device 700 may correspond to a laptop computer, mobile phone, PDA, tablet computer, portable media player, digital camera, and/or other type of battery-powered electronic device. Battery 706 may correspond to a battery pack that includes one or more battery cells. Each battery cell may include a set of layers sealed in a pouch, including a cathode with an active coating, a separator, an anode with an active coating, and/or a binder coating. During manufacturing of the battery cell, a pressure of at least 0.13 kilogram-force (kgf) per square millimeter and a temperature of about 85° C. may be applied to the layers. In addition, the pressure and/or temperature may be applied to the layers for about eight hours. The combination of pressure, temperature, and time may increase the stiffness of the battery cell and improve the resistance of the battery cell to mechanical stress.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for manufacturing a battery cell, comprising:
   obtaining a set of layers for the battery cell, wherein the set of layers comprises a cathode with an active coating, a separator, and an anode with an active coating;
   sealing the layers in a pouch to form the battery cell, wherein the pouch is flexible; and
   increasing a stiffness of the battery cell by applying a pressure of at least 0.13 kilogram-force (kgf) per square millimeter and a temperature of about 85° C. to the layers, wherein the pressure and the temperature are applied to the layers for about eight hours.

2. The method of claim 1, further comprising:
   winding the layers to create a jelly roll prior to sealing the layers in the flexible pouch.

3. The method of claim 1, further comprising:
   performing a formation charge on the battery cell prior to applying the pressure and the temperature to the layers; and
   degassing the battery cell after applying the pressure and the temperature to the layers.

4. The method of claim 3, wherein degassing the battery cell involves:
   puncturing a portion of the pouch that does not contact the layers to release gas generated during the formation charge by the battery cell; and
   resealing the pouch along a line that is closer to the layers than the punctured portion; and
   removing extra pouch material associated with the punctured portion from the battery cell.

5. The method of claim 1, wherein the layers further comprise a binder coating that laminates the layers together upon applying the pressure and the temperature to the layers.

6. The method of claim 5, wherein the binder coating is approximately 1 micron thick.

7. The method of claim 5, wherein the binder coating is applied to at least one of the cathode, the anode, and the separator.

8. The method of claim 7, wherein the binder coating is applied using at least one of a dip-coating technique and a spray-coating technique.

9. The method of claim 3, further comprising:
   prior to performing the formation charge on the battery cell, flattening the battery cell by applying a pressure for about a minute to the layers.

* * * * *